United States Patent Office 3,107,200
Patented Oct. 15, 1963

3,107,200
INSECTICIDAL COMPOSITION COMPRISING 1-HALOPHENYL-1-NITROPHENYL - 2 - DIHALO-3-MONOHALO-BUTANE
Jorge E. Biro, Buenos Aires, Argentina, assignor of one-half to Federico Fernandez Pita, Buenos Aires, Argentina
No Drawing. Filed Dec. 15, 1959, Ser. No. 859,575
6 Claims. (Cl. 167—30)

The present invention relates to novel compositions of matter useful for combatting and devitalizing insects. It includes a method for the production of such compositions and for killing insects.

It is a primary object of this invention to provide an insecticide whose devitalizing efficacy approaches or equals that of known compositions whose molecule contains phosphorus or at least six chlorine atoms while being practically innocuous to warm-blooded creatures, including man.

It is a concomitant object of the invention to provide a highly effective insecticide which may be applied without special precautionary measures to protect people and useful animals.

In German Patent No. 741,661, Paul Müller disclosed the excellent insecticidal properties of 1,1-bis-(p-chlorphenyl)-2,2,2-trichlorethane, commercially known as DDT. However, experience has shown this composition to be ineffective against numerous plagues encountered in agriculture and cattle breeding. Other vermin have gradually acquired an increasing immunity to DDT.

Extensive research has accordingly been conducted to increase the efficiency of DDT and to enlarge its field of application by altering the structure of its molecule

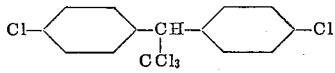

While Dr. Müller has suggested that the phenyl radicals may be substituted by aliphatic, araliphatic, aromatic and heterocyclic radicals (see also U.S. Patent No. 2,329,074) in the above structure, only the diphenyl compounds have found practical application as insecticides. German Patent No. 885,327 discloses various experiments to alter the molecule of these diphenyl compounds but experience proved that even small molecular changes completely eradicated the insecticidal potency of the composition. For instance, it has been found that the removal of one molecule of hydrochloric acid, or the removal of chlorine from one or from both phenyl radicals, or the substitution of the residual hydrogen of the ethyl radical by chlorine, or the introduction of a nitro radical into one or into both phenyl radicals practically eliminated the compound's insecticidal property.

In German Patent No. 874,086, the subsequent nitrification of DDT has been proposed but this only eliminates the crystallization of DDT from its aqueous dispersion without increasing its insecticidal action.

In all previous efforts to improve DDT by altering its molecular structure, the ethyl radical has been maintained and no increase in the insecticidal potency of the product was obtained. Hence, attempts were made to produce higher-efficiency insecticides by providing compounds whose molecules contain phosphorus or at least six chlorine atoms. Such compositions are highly toxic to man and warm-blooded animals, however, and even when applied with all possible precautions, fatal accidents to the staff handling these products have been unavoidable.

I have made the unexpected discovery that a DDT-type insecticide of equal efficiency as the last-mentioned compounds but substantially non-toxic to warm-blooded creatures may be produced by linking the phenyl radicals of the DDT molecule with a halogenated butyl radical, instead of an ethyl radical, and by substituting a nitro radical for the chlorine atom in one of the phenyl radicals. Accordingly, I have produced an insecticide of the general formula

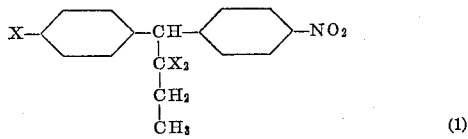

or preferably

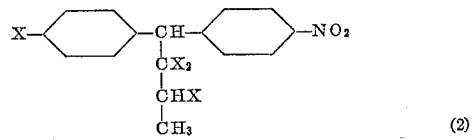

wherein X represents a halogen atom. Chlorine is the preferred halogen because the insecticidal efficacy of bromine and iodine is smaller than that of chlorine and the toxicity of fluorine to warm-blooded creatures is higher than that one of chlorine.

Compound (1) is a 1-halophenyl-1-nitrophenyl-2-dihalo-butane while compound (2) is a 1-halophenyl-1-nitrophenyl-2-dihalo-3-monohalo-butane.

The following examples illustrate the production of the compounds of the present invention without in any way limiting it thereto. All parts are by weight unless otherwise stated.

*Example 1*

One mol of chlorobenzene and one mol of nitro-benzene were condensed with one mol of butylchloral or butyl chloralhydrate by strongly stirring the mixture with an excess of a water absorbent substance, such as concentrated sulphuric acid (of 98% strength). During the condensation, one oxygen atom of the butyl aldehyde radical and one hydrogen atom of each of the benzene radicals form one molecule of water. In this exothermic reaction, stirring and cooling was continued until the reaction mass had cooled down to ambient temperature.

When working with absolutely pure raw materials, the resultant chlorine product is a limpid liquid of the general Formula 1, having a density of 1.215 and a boiling point of about 167° C. It is insoluble in water but easily soluble in benzene. Mixed with a detergent or surface active agent, the liquid forms a stable aqueous emulsion.

While this product used alone or in an inert carrier is a highly effective insecticide, its efficiency may be further enhanced and the possibility of vermin acquiring an immunity thereagainst practically reduced to nil by adding thereto fractions, for instance about 10% by weight, of one or more compounds of the group: benzil, dioxan, diphenylmethane and xanthone.

The insecticide, with or without the above additives, may be applied in aqueous emulsions of any desired strength, the emulsion containing, for instance 3% to 15% of insecticide, by weight. It may also be scattered in an admixture with pulverized minerals, such as china clay or steatite.

It will be understood that the above mentioned chlorine containing raw materials may be substituted completely or in part by corresponding raw materials containing bromine, iodine or fluorine to obtain the corresponding end products.

*Example 2*

It may be understood that instead of the butylchloral any other similar compound may be used, which under the action of sulphuric acid would produce the corresponding butyl radical, such as the butylchloralhydrate, or the dichloro-dibutyl-acetal, which under the action of sulphuric acid liberates two molecules butylalcohol and is transformed into butylchloral. Hence in the following example dichloro-dibutyl-acetal of the formula $$CH_3—CH_2—CCl_2—CH(C_4H_9O)_2$$

is used instead of butylchoral.

112.5 parts of chlorobenzene, 122 parts of nitrobenzene and 257 parts of dichloro-dibutyl-acetal are thoroughly mixed with 200 parts of sulphuric acid of 98%. The mixture is cooled to 5° C. and thereupon introduced successively, while stirring, into 3500 parts of water of 5° C., cooling the mixture caring that its temperature should be kept between 30°–40° C. After resting the mixture during about half an hour, the liquid will separate into two layers. The upper one consisting of diluted sulphuric acid and some butylalcohol, while the lower one is constituted substantially by the active substance of the insecticide. The upper layer is carefully removed as far as possible, while the lower layer is washed with fresh water.

This washing procedure is repeated until the product is nearly neutral. The remaining traces of acid are neutralized with barium carbonate.

Another mixture is prepared from 35 parts of xanthone, 65 parts of benzene and 456 parts of an emulgent, f.e. the product known under the name "Tween 20," produced by the Atlas Powder Company of Wilmington 99, Delaware, U.S.A.

This mixture is mixed with the neutralized reaction product, whereupon as much water is added that the water contents of the total mixture should be about 1000 parts, resulting in an emulsion containing about 40% of active substance.

What I claim is:

1. An insecticidal substance comprising, as an essential active ingredient, a compound of the general formula

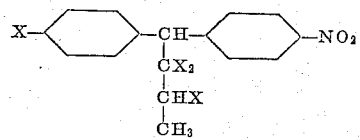

wherein X is a halogen atom, an additive of at least one compound selected from the group consisting of benzil, dioxan, diphenylmethane and xanthone, and an inert carrier for said compounds.

2. The insecticidal substance of claim 1, wherein the additive does not exceed about 10%, by weight, of the active ingredient.

3. A method of devitalizing insects comprising the step of subjecting them to the action of a compound of the general formula

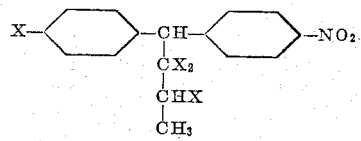

wherein X is a halogen atom.

4. The method of claim 3, wherein the halogen is chlorine.

5. A method of devitalizing insects comprising the step of subjecting them to the action of a compound of the general formula

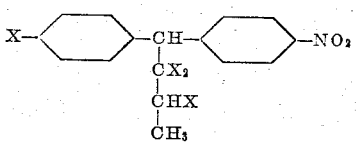

wherein X is a halogen, an additive of at least one compound selected from the group consisting of benzil, dioxan, diphenylmethane and xanthone, and an inert carrier for said compounds.

6. The method of claim 5, wherein the halogen is chlorine.

References Cited in the file of this patent

UNITED STATES PATENTS

| | | |
|---|---|---|
| 2,397,802 | Muller | Apr. 2, 1946 |
| 2,455,643 | Bakalar | Dec. 7, 1948 |
| 2,618,582 | Buckmann | Nov. 18, 1952 |
| 2,653,896 | Hodge | Sept. 29, 1953 |
| 2,653,979 | Kropa | Sept. 29, 1953 |
| 2,711,384 | Darley | June 21, 1955 |

OTHER REFERENCES

Hanna: Handbook of Agricultural Chemicals, 2nd ed., 1958, pp. 339–340.